Nov. 10, 1970    H. G. PRIVAL    3,539,913
GAS ANALYSIS APPARATUS HAVING OPPOSITELY ENERGIZED AIR GAPS
Filed June 10, 1968    3 Sheets-Sheet 2

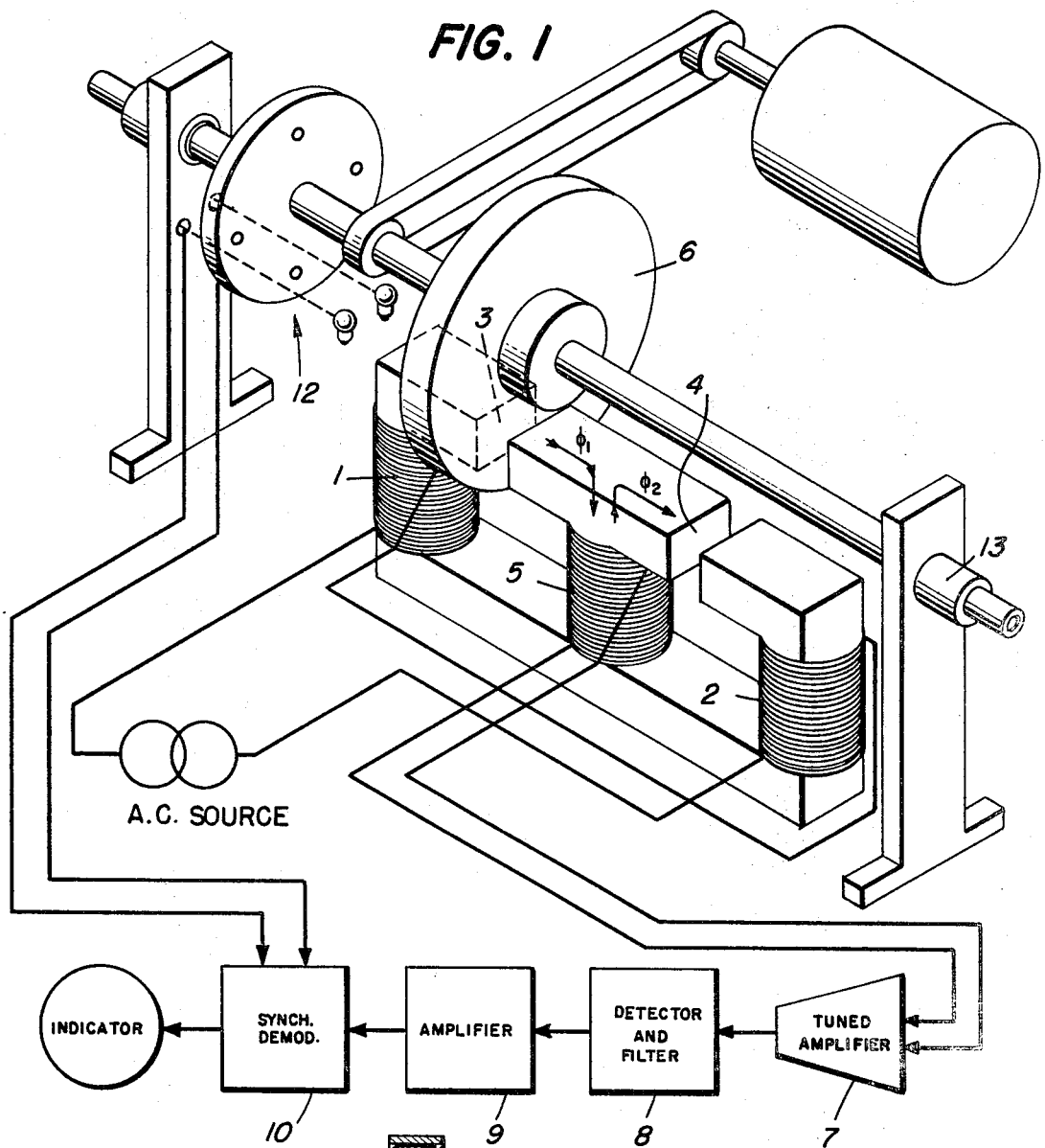
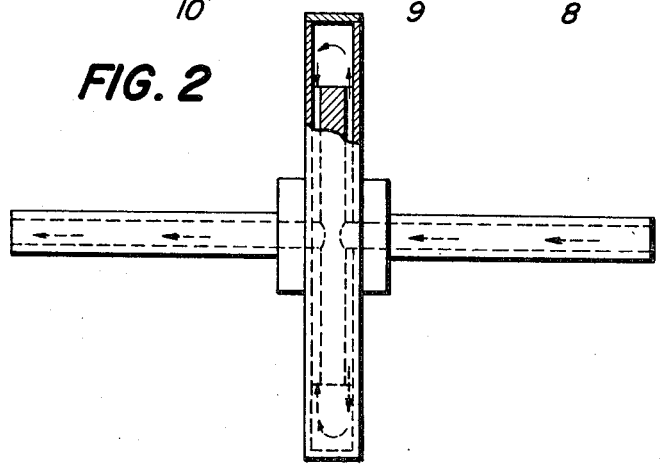

INVENTOR

Harris G. Prival

FIG. 5
FIG. 7
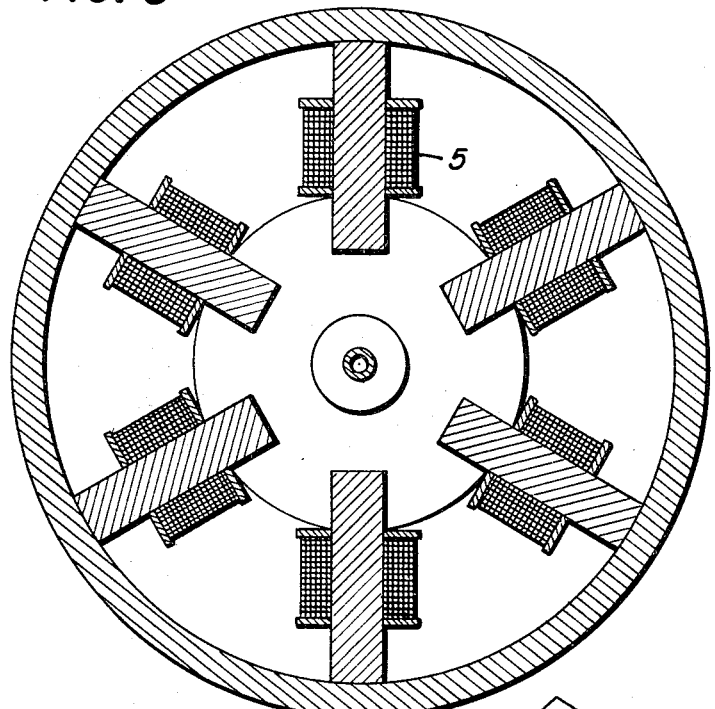
FIG. 8
FIG. 9
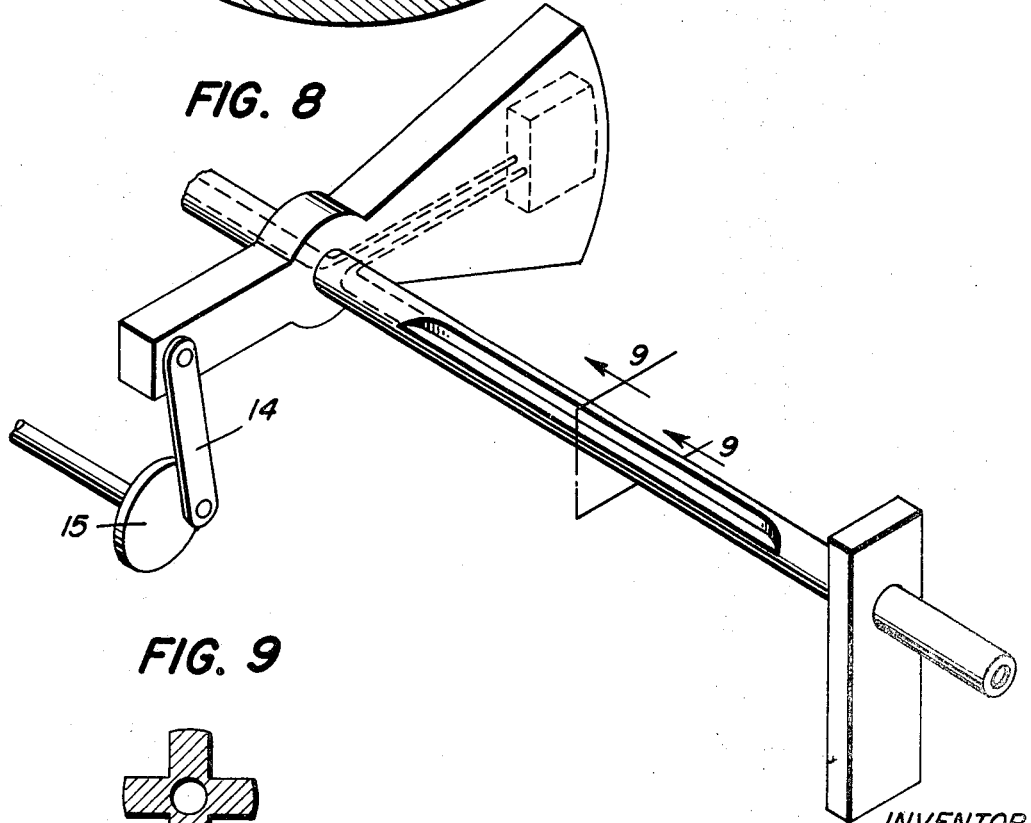
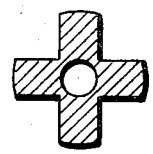
INVENTOR
Harris G. Prival United States Patent Office
3,539,913
Patented Nov. 10, 1970

1

3,539,913
GAS ANALYSIS APPARATUS HAVING
OPPOSITELY ENERGIZED AIR GAPS
Harris G. Prival, 4214 Heathfield Road,
Rockville, Md. 20853
Filed June 10, 1968, Ser. No. 735,743
Int. Cl. G01r 33/12
U.S. Cl. 324—36                                     6 Claims

ABSTRACT OF THE DISCLOSURE

The gas analysis apparatus includes a magnetic structure having one or more pairs of symmetrically disposed air gaps, each of which is excited by a high frequency alternating current supplied to a pair of field coils arranged to cause substantially equal magnetic fields in said air gaps. A sensing coil surrounding a common portion of the magnetic circuit of each pair of field coils and corresponding airgaps detects the difference in the flux in the two airgaps and provides an electrical signal proportional to this flux difference; the electrical signal constituting a residual signal with no sample in the air gaps. The residual signal is amplitude modulated by periodically inserting and withdrawing a sample of a gas to be analyzed into one of the airgaps of each airgap pair and detector means are provided to recover the amplitude modulation component.

---

The present invention relates to an apparatus for determining or measuring the partial pressure or concentration of oxygen in a mixture of gases.

It is often desirable to be able to measure the concentration of oxygen in a mixture of gases. Examples of this are the analysis of flue gas for efficient power plant or engine control, analysis of the atmosphere in submarines, spacecraft, aircraft, or diving apparatuses for the safety of the crew, oxygen analysis for medical metabolism studies, control of chemical plant processes, and many others. Presently existing oxygen analysis apparatuses generally depend on one of three techniques for their operation.

CHEMICAL ANALYSIS

These methods usually require that a sample of gas of known volume be taken and processed chemically to determine oxygen content. This method is slow, cumbersome, and not well suited to environments such as some of those mentioned above.

POLAROGRAPHIC METHODS

Polarography depends upon certain electrochmical reactions, which take place in a cell, whose rate is determined by oxygen concentration. While these apparatuses can be made quite small and rugged, they are subject to exhaustion of the chemical reactants and hence have limited life. They are also strongly temperature dependent and require a relatively long time to achieve equilibrium (many seconds to minutes) after a change in oxygen concentration.

MAGNETIC METHODS

These methods depend on the paramagnetic properties of oxygen. Oxygen, unlike most other commonly encountered gases such as nitrogen, carbon dioxide, carbon monoxide, and the inert gases, is strongly paramagnetic. In fact, with the exception of some of the nitrogen oxides, oxygen has a volume susceptibility hundred to thousands of times greater than that of the other common gases. Consequently, if a measurement is made of the magnetic susceptibility of a gas sample containing oxygen, the ob-

2 served susceptibility is proportional to the oxygen concentration to a very small error.

Although oxygen has a relatively very large susceptibility, the difference between the relative permeability of a vacuum and oxygen at standard temperature and pressure is very small, approximately $1.5 \times 10^{-6}$. To measure these very small permeabilities, one of three methods are generally employed.

(A) MAGNETIC FORCE BALANCE METHODS

These methods depend on the paramagnetic properties of oxygen and the minute changes in the magnetic forces on a small delicately suspended body in a magnetic field when oxygen is introduced into the magnetic field. Apparatuses of this nature such as the Gouy or Faraday balance have long been used for oxygen analysis with good results because of their excellent long term stability and reproducibility. However, because this type of apparatus is by its nature delicate, and the forces involved extremely small, it requires a relatively long time for the minute forces to produce appreciable displacements. Furthermore, again because of the delicate nature of the equipment, it is almost totally useless if subjected to even minute shock or vibration.

(B) MAGNETIC WIND OR MAGNETICALLY INDUCED FLOW METHODS

It has been suggested that the permeability of a paramagnetic gas can be determined by inducing a time varying "wind" in a chamber containing the gas and detecting this "wind" or differential flow by means of a condenser microphone, a hot wire anemometer or other conventional sound pickups. These devices suffer from the fact that not only is the desired signal extremely small, and consequently has a very poor signal to noise ratio, but the devices used to measure the flow effects have rather poor calibration stability. This means that apparatuses of this type require frequent recalibration in order to be useful.

(C) INDUCTOR GENERATOR TECHNIQUES

In the inductor generator, or Alexanderson alternator, high frequency alternating currents are generated by rotating a salient pole iron rotor past a stator structure which is suitably polarized by a magnet or magnets in such a way that the passage of the rotor poles varies the effective permeability of the magnetic circuit at a high rate and consequently varies the flux through a portion of the magnetic circuit which is surrounded by suitable coils which translate this variation in magnetic flux into an alternating voltage. In a similar manner, a device for measuring the susceptibility of a gas can be constructed by replacing the iron rotor with a device which alternately inserts and withdraws a paramagnetic gas sample from the flux path. Operating in the same way as the inductor generator, a voltage will be generated whose magnitude will depend on the change in effective permeability and consequently on the concentration of the paramagnetic gas.

Two devices employing this principle have been developed, the first, by A. J. Hornfeck (U.S. Pat. No. 2,467,211) and the second by W. J. Greene (U.S. Pat. No. 2,689,332). In the first of these devices, the insertion and withdrawal of the gas is accomplished by having the entire magnetic structure immersed in the gas being analyzed and periodically displacing the gas from the airgap by the passage of the teeth of a magnetically neutral toothed rotor which is driven by an external motor at high speed. The second of these devices employs chambers in a rotating wheel made of non-magnetic material to alternately carry samples of a reference gas and the gas to be analyzed through the air gap of the magnetic structure, in rapid succession.

In both of these devices, the signal voltage E developed, is given by the familiar electromagnetic relation (1) $$E = N \frac{d\phi}{dt}$$

Where N is the total number of series connected turns in the coils, and $d\phi/dt$ is the time rate of change of magnetic flux. Since as mentioned above, the volume permeability of oxygen at standard temperature and pressure differs from unity by only about 1.5 parts in a million, in order to obtain more than a minute differential flux, a very high polarizing flux must be employed. Further, to obtain a usable signal voltage, a large number of turns, N, must be used and a high rate of flux change, implying a high rotational rotor speed must be employed. This high value of polarizing flux and large number of turns necessarily implies a device similar to a dynamic microphone, and one very sensitive to structural vibrations even though partial cancellation of the microphonic effect can be obtained by suitable symmetrical construction and potting or encapsulating as much of the magnetic structure as possible, as in the Greene patent. The high rotational speed required for a reasonable value of $d\phi/dt$ almost insures that structural vibrations will be present with frequency components at the same frequency as that of the oxygen signal, and hence will produce error signals which are indistinguishable from the oxygen signal. Another difficulty with these devices arises from the fact that the high energy permanent magnet materials used to establish the polarizing flux, such as Alnico, have quite low values of incremental permeability. Alnico, for example, has an incremental permeability of only between 2 and 3. This means that if these magnets are part of the magnetic circuit which carries signal flux, it is as if an airgap having a length from ½ to ⅓ the length of the magnet were inserted in series with the airgap where the gas sample is applied. Since under these conditions the gas acts on only a fraction of the airgap instead of its entire length, the output signal is reduced by a factor equal to the ratio of the length of the gas sample (in the direction of the flux) to the total effective air gap length. This difficulty can be at least partially avoided by the use of a symmetrical flux path as in the Greene patent, however, only at the expense of a larger magnet for the same flux.

The present invention overcomes most of the objections to the above mentioned apparatuses. Its operation depends on measuring the magnetic susceptibility of a small volume of gas. Consequently, it possesses the long term stability and reproducibility of some of the magnetic devices referred to above. However, as it operates on an entirely different principle, it is relatively rugged and much more insensitive to shock and vibration than any of the above mentioned devices.

FIG. 1 is a perspective view of the gas analysis apparatus of the present invention with electrical circuitry illustrated by block diagram;

FIG. 2 is a partially sectioned view of the rotor of FIG. 1;

FIG. 5 is a sectional view taken along lines 5—5 of FIG. 4;

FIG. 7 is an end view of the rotor of FIG. 6;

FIG. 8 is a perspective view of an oscillating rotor and drive means for use with the present invention; and FIG. 9 is a sectional view taken along lines 9—9 of FIG. 8.

Figure 3:
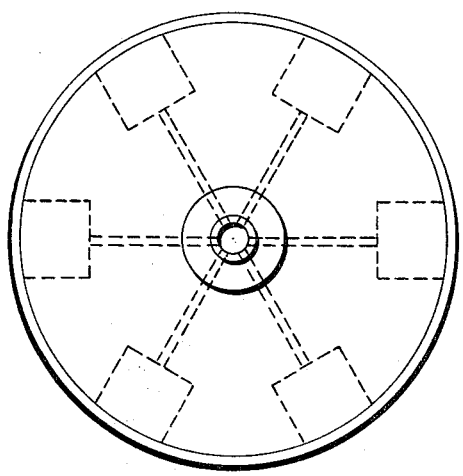
FIG. 3 is a view in front elevation of the rotor of FIG. 2 with gas chambers and flow paths shown in broken lines.

In this invention, the susceptibility of a gas sample is measured by measuring the change in alternating flux in a magnetic circuit when a gas sample is inserted into and withdrawn from the flux path. To better explain the operation of this invention, consider FIG. 1, which shows a diagram of one particular embodiment of the invention. This realization of the invention is not the only one possible, or even a preferable one, but is shown mainly because of the ease of explaining its principles. In FIG. 1, 1 and 2 are field coils excited with a high frequency alternating current from an external source. These coils are connected in series as shown with polarities such that coil 1 establishes a clockwise flux across its airgap 3 and through the center leg of the core while coil 2 establishes a clockwise flux across its airgap 4 and through the center leg. Note that the two fluxes in the center leg tend to cancel each other. Coil 5, around the center leg senses the net flux in this leg, and produces at its terminals, an alternating voltage proportional to it. Now neglecting leakage, all of the flux from each airgap passes through the center leg of the core. Consequently, if the permeability of, say, airgap 3 is increased from 1.00000 to 1.0000015, by the presence of oxygen in the airgap, the flux from coil 1 through the center leg is increased by a factor 1.0000015. Now if the device were constructed perfectly symmetrically, the flux from coil 2 through the center leg would be equal and opposite to the flux from coil 1 with no oxygen present in the airgap 3. Hence, the net flux in the center leg would be .0000015 times the air gap fluxes, and the voltage $E_0$ produced by the coil 5 would be:

(2) $$E_0 = \frac{E_s}{2} \times .0000015 \times \frac{N_5}{N_1}$$

where $N_5/N_1$ is the ratio of the number of turns in coil 5 to that in coil 1. Further, the output voltage $E_0$ would be directly proportional to the change in susceptibility, and hence to the oxygen concentration. However, it is not possible to achieve a balance in the fluxes from coils 1 and 2 to 1 part in $10^8$, as would be required for an accuracy of about 1% if this mode of operation were used. It is, however, perfectly feasible to achieve a balance to, say, 1 part in $10^4$. With this degree of balance of the two fluxes, a residual voltage $E_R$ equal to:

(3) $$E_R = \frac{E_s}{2} \times \frac{N_5}{N_1} \times 10^{-4}$$

will appear across coil 5 with no oxygen in the airgap. Now if oxygen at standard temperature and pressure is introduced into the airgap, the voltage $E_0$ will become (4) $$E_0 = \frac{E_s}{2} \frac{N_5}{N_1} \times 10^{-4} (1 \pm 1.5 \times 10^{-2})$$

where the plus or minus sign will depend on whether the zero oxygen flux from coil 1 is larger or smaller than that from coil 2. Notice that now the 100% oxygen signal amounts to about 1.5% of the signal from coil 5. If now the rotor 6 is caused to rotate, thereby alternately introducing a gas sample and a magnetically neutral reference material into the airgap, then the residual alternating voltage from coil 5 will be modulated by the oxygen at a rate given by the rotor speed in revolutions per second times the number of gas chambers around the periphery of the rotor. Stated explicitly, if $\omega_c$ is the excitation frequency of coils 1 and 2 in radians per second, $\omega_r$ is the rotor speed in radians per second, $n$ is the number of gas chambers in the rotor, and K the magnetic susceptibility of the gas being analyzed, then the output voltage $E_0$ is given by:

(5) $$E_0 = \frac{E_s}{2} \frac{N_5}{N_1} (\alpha + 4\pi K \sin n\omega_r t) \sin \omega_c t$$

where $\alpha$ is the ratio of the residual voltage to the supply voltage times the turns ratio. Equation 5 expresses the usual equation of an amplitude modulated signal, where the percent modulation is 400 $\pi K/\alpha$. Notice in this equation that the magnitude of the output voltage does not depend on the rotor speed. The rotor speed only determines the modulation frequency, and hence may be made very slow in order to minimize noise and structural vibrations. It is further evident from Equation 5, that although the percent modulation is increased by a factor $1/\alpha$ (where $\alpha$ represents the degree of balance) over what it would be if the magnetic nulling were not used, the absolute peak to trough amplitude of the modulation itself is proportional only to the magnetic susceptibility K, and not to $\alpha$. Since it is just this peak to trough amplitude which determines the output from an ordinary non-synchronous detector acting on the amplified signal from coil 5, the magnitude of the alternating output signal from the detector 8 at the frequency $n\omega_r$ is directly proportional to the susceptibility.

Any change in the degree of balance only affects the DC output from the detector, and not the component at the frequency $n\omega_r$.

The purpose of the magnetic nulling, of which $\alpha$ is a measure, is to reduce very greatly the dynamic range of the signal from coil 5. Without the magnetic nulling, as mentioned earlier, the 100% oxygen signal would only cause a change in output voltage of 1.5 parts in a million. With the magnetic nulling, the 100% oxygen signal causes a change in the output signal of about 1.5%. Needless to say, other forms of nulling can be used to enhance the signal, such as electrical subtraction of a reference signal. However, to obtain a signal even at millivolt levels, would require the subtraction of two signals in the tens to hundred of volts range, with the obvious difficulties caused by phase shifts and harmonics. Consequently the magnetic method is considerably superior. In a usual realization of the subject invention, the frequency of the oxygen signal $n\omega_r$ will be small compared to the carrier frequency $\omega_c$. Hence, the sideband frequencies $\omega_c+n\omega_r$ and $\omega_c-n\omega_r$ which carry the desired information, will be relatively close to the carrier frequency. This, and the fact that an ordinary nonsynchronous detector is insensitive to carrier phase shift, allows the use of sharply tuned amplifiers 7 to amplify the signal from the coil 5. Since the carrier frequency $\omega_c$ can be made quite high (in the hundreds of kilocycles with ferrite magnetic structures) the signal frequencies can be widely separated from any low frequency noise.

Since the oxygen signal from the detector is known to be an alternating signal having a frequency $n\omega_r$, the signal to noise ratio can be further improved by synchronous detection of this signal. This is because the synchronous detector and low pass filter acts as a very narrow band pass filter centered on the frequency of the oxygen signal, $n\omega_r$. Further, if the necessary reference signal is obtained from an optical or other pickup attached to the rotor shaft, then the device becomes insensitive to moderate variations in rotor speed. The equivalent narrow band filter in effect tracks the signal frequency. Since noise tends to be distributed over a wide band of frequencies, the use of a narrow band filter centered on the signal frequency tends to reject a large portion of the noise and hence greatly enhances the signal to noise ratio. FIG. 1 shows the optical pickup 12, and the associated synchronous detector 10.

With the exception of the air gaps, the entire magnetic structure is made of high permeability material. Since no permanent magnet materials are used, essentially all of the magnetomotive force produced by coils 1 and 2 is expended in the airgaps, where it is effective in producing a signal proportional to the oxygen concentration.

The fact that the magnitude of the oxygen signal is independent of the speed of insertion and withdrawal of the gas sample from the airgap makes possible many different techniques for accomplishing this. The one shown in FIG. 1, and similar methods have the advantage that only a relatively small volume of gas is contained in the apparatus. Consequently, variations in the oxygen concentration of an incoming gas stream are very rapidly reflected in changes in the output signal. In FIG. 1 the gas to be analyzed is admitted to the rotating portion of the apparatus through rotary seal 13. It passes through the hollow shaft and passages in the rotor into the gas chambers which are equally spaced around the periphery of the rotor. Gas exits from these chambers through another set of passages in the rotor into the other half of the hollow shaft (which does not communicate directly with the first half) and from thence through the second rotary seal where it leaves the apparatus. FIGS. 2 and 3 show the gas paths through the shaft and rotor.

Figure 4:
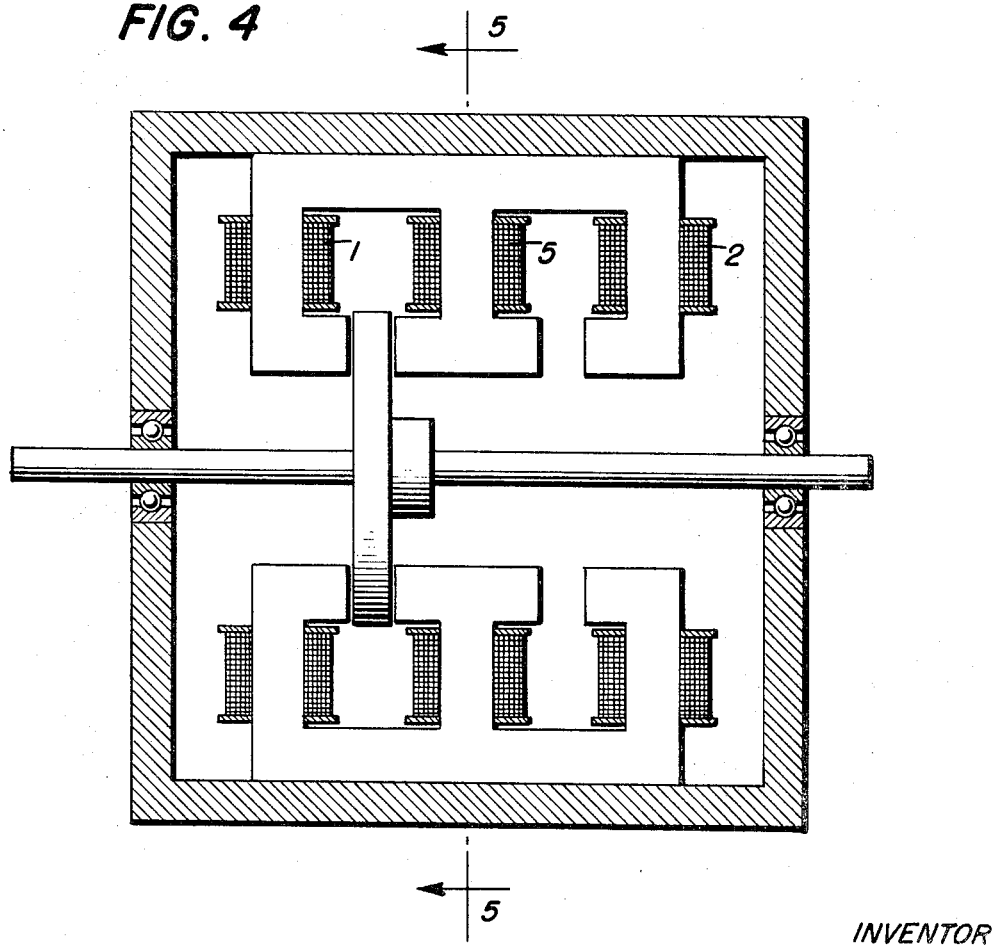
FIG. 4 is a longitudinal section of a second embodiment of the gas analysis apparatus of the present invention.

Rotation of the rotor alternately carries gas chambers and solid rotor material through the airgap. Consequently, the signal produced by the apparatus is actually proportional to the difference in permeability between the rotor material and the sample gas. Since the permeability of the rotor material may be appreciable compared to that of the gas, a correction must be made. This is easily accomplished by adding a small bias to the output signal from the synchronous detector. As mentioned earlier, the realization of this invention just described is not an optimum one, but is used mainly for expository purposes. A more efficient form of the apparatus is shown in FIGS. 4 and 5. Here, a plurality of magnetic structures similar to that described above are disposed about one rotor so that all of the gas chambers are utilized simultaneously. All of the output coils 5 are connected in series giving an output signal $n$ times larger than that obtained from the apparatus first described.

Figure 6:
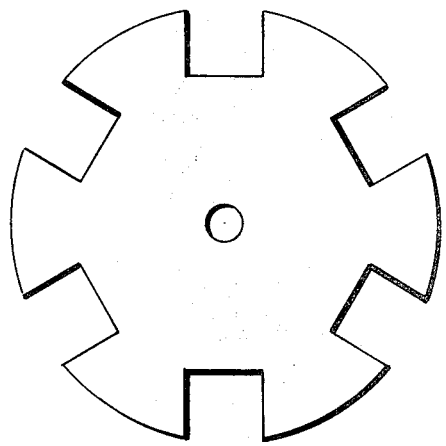
FIG. 6 is a view in front elevation of a toothed rotor for use with the present invention.

Either a rotor with internal chambers such as in FIG. 2, or a toothed rotor as shown in FIGS. 6 and 7 may be used. With the toothed rotor, the entire apparatus is enclosed in a container into which the gas to be analyzed is introduced. The passage of the non magnetic rotor teeth periodically displaces the gas from the magnetic circuit airgaps. Since the output signal magnitude is independent of rotor velocity, a relatively slow back and forth oscillation of the rotor through the angle subtended by a pair of adjacent gas chambers is just as effective as a continuous rotation of the rotor. With this in mind, the rotor with internal chambers as shown in FIG. 2 can be advantageously utilized in a device which avoids the use of both rotary seals and bearings, with correspondingly long life and high reliability.

This technique is shown in FIGS. 8 and 9. The round hollow shaft of FIG. 1 is replaced with a shaft portions of which have a cruciform cross section. This type of shaft has the property that while it may be quite rigid in bending, it may be made quite flexible in torsion. Consequently, the shaft may be fixed rigidly at its ends, giving sturdy support to the rotor, while also serving as a torsional spring, allowing the rotor to rotate through the required angle. The rotor is then caused to oscillate back and forth by the arm 14 connected to the shaft near the rotor, which is in turn driven by a reciprocating mechanism such as the motor driven eccentric 15 shown. Since the ends of the shaft are rigidly fixed, no rotary seals are required to conduct the gas to or from the hollow shaft. Similarly, with the torsional spring support for the rotor, no bearings are required.

What is claimed is:

1. A gas analysis apparatus comprising core means having at least one pair of air gaps, coil means mounted upon said core means and operative upon excitation thereof by a high frequency alternating current to introduce fluxes in said core means to cause substantially equal magnetic fields in said air gaps, the fluxes from each of said air gaps flowing in opposite directions through a common portion of said core wherein they tend to cancel leaving only a small residual flux whose magnitude is proportional to the instantaneous differences between the fluxes in the paired airgaps, sensing coil means surrounding said common portions of said core means to detect said residual flux and to produce an electricl signal which is a function of said flux difference, said electrical signal constituting a residual signal which is a function of the residual flux when said airgaps are empty, sample control means for periodically inserting and withdrawing a sample of gas to be analyzed into one air gap of said air gap pair to cyclically alter the permeability of one air gap relative to the other and thereby amplitude modulate the alternating residual signal from said sensing coil means with a low frequency modulation component which is a function of the difference in permeability caused by said gas sample, first tuned amplifier means connected to said sensing coil means to receive the electrical signal from said sensing coil means, amplify it and to remove noise components at frequencies remote from that of said high frequency exciting current, detector and filter means connected to receive the signal from said first tuned amplifier means and to extract the low frequency modulation components therefrom, second amplifier means connected to receive the low frequency modulation signal from said detector filter means and ampliy it, a synchonous demodulator supplied with a reference signal having a frequency exactly that of the frequency of said cyclically acting sample control means, connected to receive said amplified signal from said second amplifier means, said synchonous demodulator acting to detect only the frequency of said cyclically acting sample control means and rejecting all others, thereby providing an output signal proportional to the paramagnetic gas concentration and having a relatively high signal to noise ratio.

2. The gas analysis apparatus of claim 1 wherein said sample control means operates to alternately interject a gas sample and a magnetically neutral reference material into said one air gap.

3. The gas analysis apparatus of claim 1 wherein said synchronous detector means includes a synchronous detector and sensing means adapted to sense the frequency of insertion of said gas sample by said sample control means, said sensing means operating to provide an electrical signal indicative of said insertion frequency to said synchronous detector.

4. The gas analysis apparatus of claim 3 wherein said sample control means includes a rotor formed from substantially magnetically neutral material having a plurality of gas chambers equally disposed about the periphery thereof, an inlet and outlet passage communicating with each said chamber, first and second hollow rotor shafts secured to the center of said rotor on opposite sides thereof, said inlet passages communicating with the interior of said first rotor shaft and said outlet passages communicating with the interior of said second rotor shaft, and means to support and rotate said rotor to bring the gas chambers and rotor material alternately through an air gap in the air gap pair.

5. The gas analysis apparatus of claim 4 wherein said core means includes a pair of air gaps for each gas chamber on said rotor means, said air gaps being equally spaced about said rotor to permit the simultaneous reception by one air gap of each air gap pair of a gas chamber and said sensing coil means including a sensing coil for each air gap pair, said sensing coils being connected in series.

6. The gas analysis apparatus of claim 3 wherein said sample control means includes a gas sample support of a magnetically neutral material in said one air gap, said support having a gas chamber therein, a first torsionally resilient hollow shaft connected to one side of said support, a second hollow shaft connected to the opposite side of said support, an inlet passage extending between the interior of said resilient shaft and said gas chamber, an outlet passage extending between the interior of said second hollow shaft and said gas chamber, and drive means connected to alternately oscillate said gas chamber and magnetically neutral sample support into said air gap.

References Cited
UNITED STATES PATENTS

| | | | |
|---|---|---|---|
| 2,689,332 | 9/1954 | Greene | 324—36 |
| 3,049,665 | 8/1962 | Hummel | 324—36 |

ALFRED E. SMITH, Primary Examiner